May 8, 1923.  1,454,245

H. O. MAINZINGER

VEHICLE WHEEL

Filed July 30, 1920

Inventor
Harry O. Mainzinger

By
Attorneys

Patented May 8, 1923.

1,454,245

UNITED STATES PATENT OFFICE.

HARRY O. MAINZINGER, OF DETROIT, MICHIGAN, ASSIGNOR TO WHITEHEAD AND KALES CO., OF DETROIT, MICHIGAN, A CORPORATION OF MICHIGAN.

VEHICLE WHEEL.

Application filed July 30, 1920. Serial No. 400,181.

*To all whom it may concern:*

Be it known that I, HARRY O. MAINZINGER, a citizen of the United States of America, residing at Detroit, in the county of Wayne and State of Michigan, have invented certain new and useful Improvements in Vehicle Wheels, of which the following is a specification, reference being had therein to the accompanying drawings.

This invention relates to vehicle wheels and more particularly to wheels for tractors and farm implements.

It is the object of the invention to provide a tread member adapted to be temporarily attached to a vehicle wheel having traction projections such as are commonly employed on wheels of tractors, farm implements and other vehicles normally traveling upon unpaved surfaces, said tread member providing a guard or cover for the traction projection so as to permit the vehicle equipped with such a wheel to travel upon paved surface when desired without injury to said surface by the traction projections.

The invention consists in the structural features hereinafter fully described and shown in the accompanying drawings, wherein.

Figure 3:
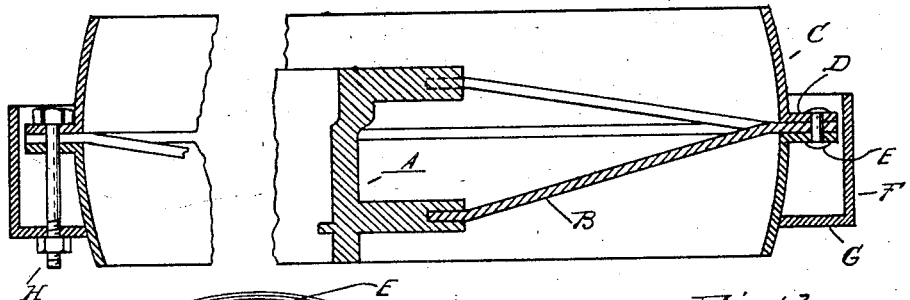
Figure 3 is a diametrical sectional view thereof taken upon line 3—3 of Figure 1.
Figure 2:
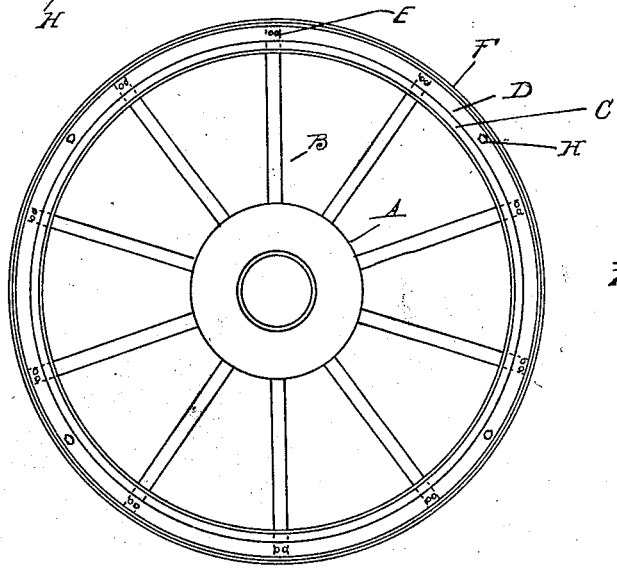
Figure 2 is an outer side view of the same.
Figure 1:
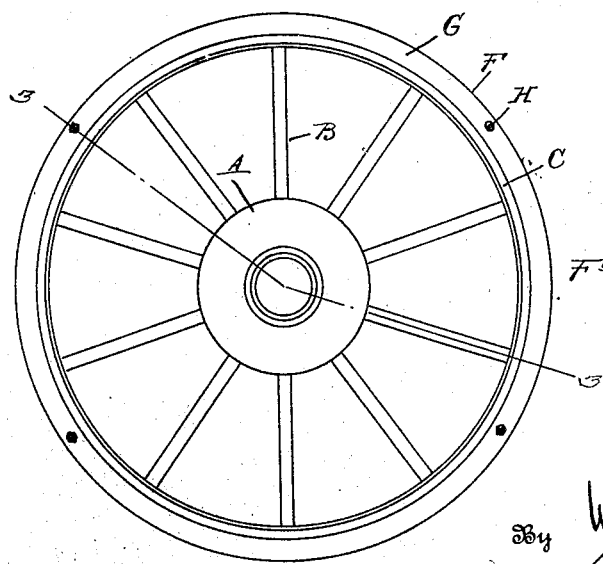
Figure 1 is an inner side view of a wheel equipped with the herein described tread member.

In these views the reference character A designates the wheel hub, B strap metal spokes radiating from said hub, and C the pair of complementary rim members between which the outer extremities of the spokes are clamped. The members C are respectively formed with annular outwardly projecting flanges D engaging the spokes, and rivets or the like, such as are indicated at E, pass through said flanges and through the spokes clamping the latter between the former. In the illustrated embodiment of the invention the rim members C are gradually reduced in diameter from the flanges D to their outer edges, as is best seen in Figure 3. F indicates a temporary tread member which is detachably mounted upon the rim of the described wheel to cover the traction projections formed by the flanges D. Said tread member has at one side thereof an inwardly projecting annular flange G for seating upon the outer tapering rim member C, said flange being bolted at various circumferentially spaced points to the flanges D, as indicated at H, said bolts drawing said flange G tightly into the inclined seat provided by the outer rim member C. The temporary tread surface provided by the member F may be of a width considerably less than the permanent tread face which is formed by the rim members C, said tread surface extending inwardly from the flange G sufficiently to overhang the flanges D so as to eliminate any possibility of said flanges engaging a pavement over which the wheel is traveling and cutting or otherwise injuring said pavement. Preferably the bolts H are arranged with their heads bearing against the flanges D, said heads also bearing upon the inner rim member C so as to lock said bolts against turning and also to transmit stresses from the rim to the wheel.

The provision of traction projections upon the wheels of tractors, or other farm implements is common practice and the special function of such a traction projection as is formed by the annular flanges D is to prevent skidding, or lateral shifting of the vehicle equipped with a wheel so flanged. Such flanges, and in fact traction projections of any type, are necessarily detrimental to any pavement which may be engaged by a wheel equipped with such devices, and in fact in many communities travel of vehicles so equipped upon paved surfaces is prohibited by law. The above described invention provides a quickly attached temporary tread member, which when applied, will so cover the traction projection as to permit a vehicle having such projections on its wheels to travel on paved as well as on unpaved surfaces without detriment to the pavement and without violation of any law.

What I claim as my invention is:

1. In a vehicle wheel, the combination with the rim thereof, of an annular traction projection on said rim, and a temporary tread member detachably engaged directly with said rim and covering said annular member.

2. In a vehicle wheel, the combination with a rim comprising a pair of complementary members provided with adjacent outwardly projecting annular flanges and with means rigidly connecting said flanges, of a temporary tread member detachably engaged with said rim and covering said flanges.

3. In a vehicle wheel, the combination with a rim formed by a pair of complementary members having outwardly projecting adjacent flanges rigidly connected, of a temporary tread member mounted upon said rim and covering said flanges, and means detachably securing said tread member to the flanges.

4. In a vehicle wheel, the combination with a rim having a circumferential projection, of a temporary tread member directly mounted upon said rim and covering said traction projection, and means detachably securing said tread member to said projection.

5. In a vehicle wheel, the combination with a rim having a circumferential extending traction projection, of a temporary tread member detachably mounted upon said rim and inwardly flanged to seat upon the rim at one side of said projection.

6. In a vehicle wheel, the combination with a rim having a circumferential traction projection of a temporary tread member mounted upon said rim and covering said traction projection and inwardly flanged to seat upon the rim at one side of said projection, and means detachably connecting said inwardly projecting flange with said traction projection.

7. In a vehicle wheel, the combination with a rim member provided with an annular traction projection and gradually reduced in diameter from said projection to its outer edge, of a temporary tread member mounted upon said rim covering said traction projection and having a portion seated upon the outer portion of the rim, means clamping said seating portion of the tread member to the traction projection.

8. In a vehicle wheel, the combination with a rim member having a circumferential traction projection, of a temporary tread member detachably engaged with said rim member and formed with an inwardly projecting annular flange seating upon the rim member and clamping members detachably engaging said seating flange with said traction projection, said clamping members having projections seated upon the rim and transmitting stresses from the tread member to the rim.

9. A temporary tread member for vehicle wheels having traction projections, comprising an unjointed cylindrical member adapted to cover the traction projections and providing a tread surface, and an inwardly projecting flange upon said cylindrical member providing a seat for the tread member upon the rim of the engaged wheel.

10. In a vehicle wheel, the combination with the rim thereof, of a traction projection on said rim and a temporary tread member adapted to be inserted laterally over said projection and detachably mounted upon said rim providing a covering for said traction projection and spaced therefrom.

11. In a vehicle wheel the combination with the rim thereof, of a traction projection on said rim, and a detachable temporary tread member comprising an endless ring adapted to detachably engage said rim and form a covering for said traction projection.

In testimony whereof I affix my signature.

HARRY O. MAINZINGER.